H. WAKEMAN.
ARMOR FOR FLEXIBLE TUBING.
No. 188,554. Patented March 20, 1877.
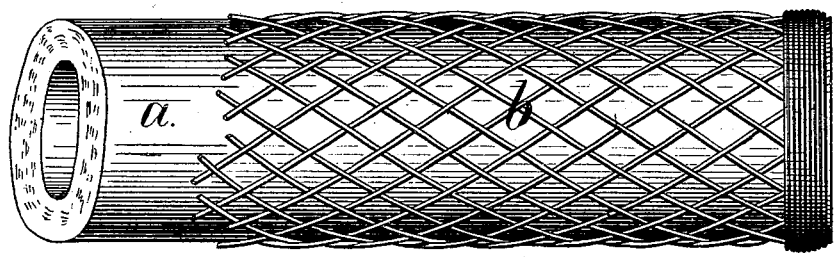
Witnesses.
Chas. H. Smith
Harold Serrell
Inventor
Harwood Wakeman.
per Lemuel W. Serrell
Atty

UNITED STATES PATENT OFFICE.

HARWOOD WAKEMAN, OF NEW YORK, N. Y.

IMPROVEMENT IN ARMOR FOR FLEXIBLE TUBING.

Specification forming part of Letters Patent No. 188,554, dated March 20, 1877; application filed November 6, 1876.

*To all whom it may concern:*

Be it known that I, HARWOOD WAKEMAN, of the city and State of New York, have invented an Improvement in Armor for Flexible Tubing, of which the following is a specification:

India-rubber and similar flexible hose has been protected with a helix of wire, both within and without, and ranges of interlaced springs have before been used by me.

My invention relates to an armor for flexible hose, formed of woven interlaced wire, having meshes of suitable size and shape, and the interlaced or woven wires run, by preference, diagonally, so as to allow the armor to yield as the hose may be bent when in use.

In the drawing I have shown a piece of flexible hose, with the interwoven wire surrounding a portion thereof.

Interwoven wire is usually known as wire-netting, and the meshes thereof vary in shape according to the manner in which the wire-netting is laid together.

I make use of a strip of this netting, preferably cut diagonally to the lines of wires, and rolled up to form the armor for the tube, the edges being united by interlaced or binding wires.

In the drawing, *a* represents the elastic or flexible tubing, and *b* the wire-netting forming the armor. This armor and tubing are, by preference, covered with tar, into which india-rubber is mixed by the addition of a mutual solvent, such as bisulphide of carbon or naphtha.

I do not claim, broadly, wire as an outer protection for hose.

I claim as my invention—

The metallic armor for flexible tubing, made of woven or interlaced wire-netting, bent up into a cylindrical form around the tube, and its edges connected together, substantially as set forth.

Signed by me this 31st day of October, A. D. 1876.

HARWOOD WAKEMAN.

Witnesses:
GEO. T. PINCKNEY,
HAROLD SERRELL.